April 13, 1965   P. F. DANEL   3,177,895
PRESSURE CONTROLLERS
Filed April 5, 1962
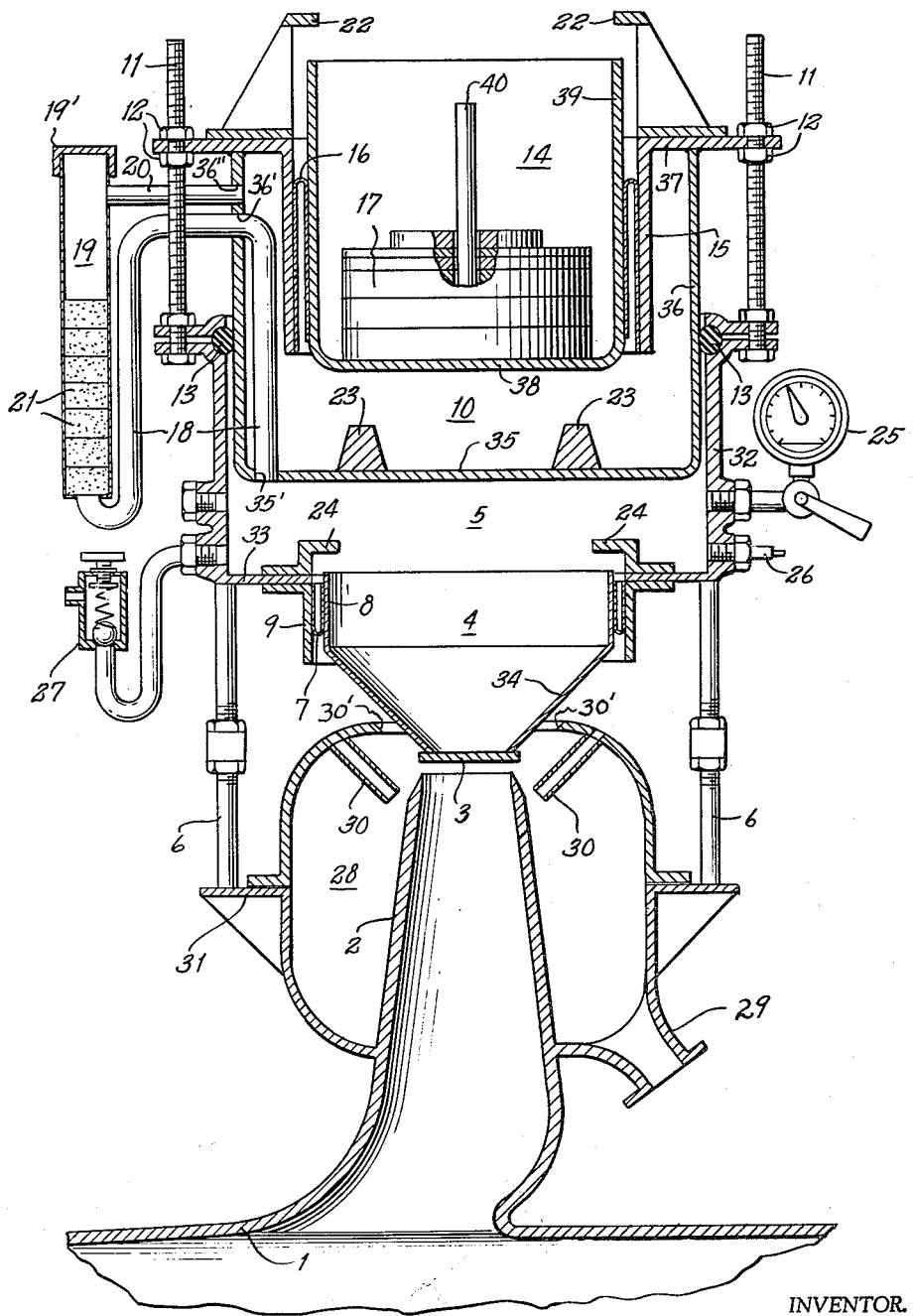
INVENTOR.
PIERRE F. DANEL
BY
ATTORNEYS United States Patent Office 3,177,895
Patented Apr. 13, 1965

3,177,895
PRESSURE CONTROLLERS
Pierre François Danel, La Tronche, France, assignor to Societe Grenobloise d'Etudes et d'Applications Hydrauliques, Grenoble, France, a corporation of France
Filed Apr. 5, 1962, Ser. No. 185,464
Claims priority, application France, Apr. 11, 1961, 4,360, Patent 1,294,292
3 Claims. (Cl. 137—514.5)

This invention relates to pressure controllers and more particularly to a controller which is especially designed to utilize the continuous escape flow of a liquid or gas from a duct or receiver of an installation to effect a very accurate and rapid control of such liquid or gas.

A useful pressure controller for the indicated purpose is disclosed in French Patent No. 999,137 dated November 15, 1945, and comprises a valve fitted to an opening in a vessel and the movable element of which is subjected to the action of a fluid jet emerging from the vessel through such opening as a result of the pressure therein which is to be controlled. The action of the jet upon the movable element of the valve is balanced by an outside elastic reaction provided by a gas contained under pressure in a container of a suitable fixed capacity. The gas acts through a piston which closes an opening in the container and which is rigidly connected to the movable element of the valve. The opening closed by the piston is hermetically sealed by an impermeable flexible diaphragm which covers the piston.

The primary purpose of the present invention is to improve the above described type of pressure controller so that it provides substantially better controlling accuracy and constancy, and to enable its characteristics to be varied so that it may be easily and rapidly adapted to a variety of installation, or to different operating conditions in a given installation.

It is proposed in the aforesaid French patent that the movable valve element in the indicated type of pressure controller may consist of a circular plate or disk having a given diameter such that the force exerted by the jet upon such plate remains practically constant, irrespective of the degree of valve opening. It has been found that such a result may be accomplished by making the diameter of the circular plate forming the movable valve element between 1.2 and 1.3 times the jet diameter. When so performing, the valve is said to provide an astatic form of control, that is, one without a decrement. This type of control however is not suitable for most control installations in respect of which it has been found that the pressure controllers therefor frequently have to be given a certain amount of permanent and/or transient lag in order to assure their satisfactory operation. A permanent lag may be achieved in a controller of the above indicated type provided with a disk as the movable valve element by selecting, as stated, a suitable diameter for the valve element. However, the above described type of controller construction does not lend itself to the provision of a transient lag.

In accordance with this invention, a controller of the above indicated type may be given a transient lag effect during the control movements performed by the valve, by dividing the gas container by a partition into two compartments and connecting such compartments by a duct which causes a loss of head when gas exchanges occur betwen the two compartments. The division of the container is made so that one of the compartments is located between the partition and the piston connected to the valve, and has a predetermined limited volume that can, if desired, be made adjustable over a given range so as to give the valve a predetermined amount of transient droop within certain limits. The other or second compartment is located between the partition and a movable wall which functions as a piston in such compartment and which is subjected to a constant outside force. With such an arrangement, a momentary variation of the gas pressure in the first compartment will occur whenever the valve performs a control movement. This pressure variation will depend on the amount of valve movement and the pre-selected compartment volume, and gives the controller the required amount of transient lag. The size of this pressure variation, and hence the degree of lag, and its duration, will also depend on the head loss caused by the resultant gas flow through the duct connecting the two compartments at the onset of the pressure variation in the first compartment. The constant outside force acting on the movable wall of the second compartment displaces such wall to the extent necessary to maintain the gas content at a rigorously constant pressure, which is restored in the first compartment when the valve movement stops.

In the aforesaid pressure controller construction, the respective volumes chosen for the two compartments should be suitably matched to the characteristics of the installation in which the controller is to operate. In selecting such volumes, factors which warrant particular attention are:

(a) The maximum ambient temperature range.
(b) The pressure range over which the controller might be required to operate, and
(c) The maximum possible amount of travel for the wall subjected to the constant force.

Should insufficient space be available in the installation at the place at which the control action is required, the second compartment and its associated constant force system may be remotely located. In such arrangement, the two compartments are interconnected by a duct of an appropriate diameter and in which a head loss controlling device is preferably placed at the point of entry of such duct into the second compartment. In other words, in such an arrangement, the duct volume should be added to that of the first compartment when calculating the latter.

It has been found, that by applying a constant force to a movable wall in the second compartment, in accordance with the invention, there is also accomplished, through the movements of such wall, an automatic correction of ambient temperature variations without entailing any gas pressure variations. In the above described prior pressure controller in which the gas is contained in a fixed volume, any ambient temperature variations will result in gas pressure variations unless this is prevented by surrounding the gas container with a constant temperature zone, such as, for instance, by circulating water at a constant temperature through such zone; a by no means negligible complication.

The aforesaid constant force may be applied in any suitable manner, such as, by placing weights directly on the movable wall of the second compartment, which is in a horizontal position. An equally suitable arrangement, would be to have bearing against the movable wall, a mobile weight mounted on a lever pivoted about a fixed axis, and which is also adaptable to automatic feed-back from the controlled pressure. It is also contemplated to combine the fixed and movable weights on a single lever. The constant force could also be provided through a fluid damping device in order to cancel out any oscillations.

In order to protect the controller and for safety reasons, the range of movement of a movable wall subjected to a constant load by weights, is restricted in both directions by travel limiting stops, which preferably should be fitted to some fixed part of the controller in order to keep its moving part as light as possible. By mounting the stops on some insulating material, they can be utilized as electric contacts in an electric circuit containing a warning signal or controlling a given operation, such as the supply of air, or the release of pressure.

In accordance with the invention, the partition between the two compartments is made adjustable to enable the volume of the first compartment, and hence the transient lag, to be controlled. To this end, the second compartment may be constituted of a cylindrical tank which is inserted into the first compartment so that its bottom end wall forms the partition between the two compartments. The tank should be constructed and arranged relative to the first compartment that it may be secured in any desired position of insertion into the latter and with the required sealing efficiency. Both the first and second compartments may also be connected to outside receivers as required.

Another feature of the invention is the control of the head loss in the communicating duct between the two compartments. This may be accomplished by providing in the duct a stack of a suitable number of circular porous elements capable of affording a linear head loss vs. velocity relationship.

The invention also contemplates the provision in the pressure controller herein, of ancillary means for ensuring that it provide a fully accurate, convenient and reliable controller operation. Thus, the first compartment may be provided with a relief valve as a safety measure against accidental excess pressures, and with a pressure gauge as a means of checking the communicating duct between the two compartments for blockage, or to ensure that the weights on the movable wall of the second compartment are adequate for the required gas pressure. A compressed air supply valve and/or a complete compressed air supply system including a pressure reducing valve would also be useful accessories. In such a supply system, the size of the reducing valve outlet should be such as to ensure that the compressed air flow is less than the relief valve flow.

In connecting the pressure controller of this invention to an installation, special care should be taken in designing the shape of the passage through which fluid from the installation is supplied to the orifice discharging onto the movable disk valve. The supply nozzle should be set in such a way that the jet discharges straight. If the fluid is water, suitable arrangements are also required to aerate the discharge as it passes through a water deflecting hood, in order to prevent any violent fluctuations in the sheet of water discharging from the valve, which might cause air to be trapped between the hood and the sheet of water forming a circular screen.

A better understanding of the pressure controller of this invention, may be had from a perusal of the following description when read in connection with the accompanying drawing which illustrates in vertical section one of several possible practical forms in which the controller can be made.

As is indicated in the drawing, the fluid duct or receiver 1 of an installation in which it is desired to maintain the fluid, such as water, at a practically constant pressure, is provided with an opening fitted with a discharge nozzle 2 directed vertically upwards. The valve 3 of the pressure controller consists of a flat disk carried by the movable bottom 4 of a first compartment 5 and positioned opposite the nozzle outlet so that it is subjected to the pressure of the water jet emitted by the nozzle. The water is deflected by the valve 3 in the form of a circular sheet into a deflecting hood 28 mounted on the nozzle 2 and having an external bracket flange 31.

Compartment 5 is composed of a metal cylinder 32 open at its top and supported by adjustable standards 6 mounted on the bracket flange 31. The bottom of cylinder 32 is composed of a circular flange 33 supporting in depending relation a cylindrical section 9 having an interior diameter substantially equal to the interior diameter of the flange 33. Concentrically located within section 9 and slidable relative thereto is a cylindrical section 8 of the movable bottom 4. The cylindrical section 8 is connected to the disk valve 3 by a frusto-conically shaped section 34 so that the movable bottom 4 has a generally frusto-conical shape. A U-section annular seal 7 is located between and attached at its sides to the cylindrical sections 8 and 9. The seal 7 permits vertical movement of the bottom 4 under the forces applied thereto with a minimum of resistance and maintains the bottom of the compartment 5 hermetrically sealed during such movement. Movement of the bottom 4 is limited in the downward direction by the engagement of the valve 3 with the outlet end of the nozzle 2 and is limited in the upward direction by the engagement of the annular section 8 thereof with stops 24 mounted on the fixed flange portion 33 of the cylinder bottom. Adjustment of the valve 3 relative to the nozzle 2 may be made by manipulating the adjusting nuts on the standards 6.

The upper end of compartment 5 is closed by the bottom wall 35 of a metal cylinder 36 in which is formed the second compartment 10; the cylinder bottom 35 therefore constituting a partitioning wall dividing the two compartments 5 and 10. The metal cylinder 36 is adjustably supported on the metal cylinder 32 with the aid of rods 11 and nuts 12. By manipulating the rods 11 and nuts 12 the volume of the first compartment 5 and consequently the degree of transient lag, may be varied to provide the desired characteristics for the installation. A circular seal 13 hermetically seals the space between the upper end of the metal cylinder 32 and the side cylindrical wall of the metal cylinder 36.

The upper end of compartment 10 is closed by an annular flange 37 mounted on the upper edge of the metal cylinder 36 and the bottom wall 38 of a cylindrical vessel 14 slidably mounted for vertical movement in a concentric cylindrical member 15 depending from the inner periphery of the annular flange 37. It is to be noted that the rods 11 for supporting the cylinder 36 on the cylinder 32 are connected by the nuts 12 to the outer periphery of the annular flange 37. A U-section annular seal 16, similar to seal 7, is located between and attached at its sides to the cylindrical member 15 and the side cylindrical wall 39 of the vessel 14, to hermetically seal the upper end of the compartment 10 throughout the movements of the vessel 14. The extent of travel of the movable wall 38 provided by the vessel 14 is restricted by the coaction with the upper end of the cylindrical side wall 39 of such vessel, of upper stops 22 mounted on the inner periphery of the annular flange 37, and by the bottom stops 23 provided on the partition wall 35 in the path of downward movement of such movable wall 38.

The movable wall 38 is biased in a downward direction by weights 17 of a determined and adjustable value placed directly on such wall through the open top of the vessel 14. As has been indicated, the constant force exerted by the weights 17 is utilized to maintain the gas content in the compartments at a rigorously constant pressure. The weights 17 may be stacked on an upright rod 40 located centrally of the wall 38.

The two compartments 5 and 10 are in communication with each other via a duct comprising a tubular section 18 which extends in hermetically sealed relation through an opening 36' in the cylindrical side wall 36 of the compartment 10. The inner end of the duct section 18 is connected to an opening 35' in partition 35 so that the passageway of such section is in communication with compartment 5. The outer end of duct section 18 is connected to the bottom end of an enlarged vertically disposed duct section 19 which is in communication at its upper end with the outer end of a reduced duct section 20. The inner end of duct section 20 is connected to an opening 36'' in cylindrical side wall 36 so as to bring the passageway of duct section 20 into communication with compartment 10. It will be noted that duct section 19 is in the form of a container with a hermetically sealed cover 19' which may be detached to add or remove the small porous blocks 21 stacked in such section and by means of which the head loss arising from flows of the gas through the duct comprising sections 18, 19 and 20, can be adjusted. Any suitable gas, such as air, is supplied to the compartments 5 and 10 through a compressed air inlet and drain valve 26 which is suitably connected to the bottom of the side wall 32 of compartment 5 and which is connected in a known manner to any suitable supply of such gas. The side wall 32 of compartment 5 is also provided at its bottom with a pressure gauge 25 and a suitable pressure relief valve 27.

It will be understood from the foregoing description that compartments 5 and 10 contain air at a predetermined pressure such that the force such air exerts upon the area of the movable wall 38 of compartment 10 is in equilibrium with the load acting upon valve disk 3 due to the jet emerging from nozzle 2, for a given value of the pressure to be controlled in the duct or receiver 1 of the installation. Any variation of such controlled pressure in the duct or receiver 1 causes the valve disk 3 to move and hence also the movable bottom 4. This movement in turn causes the air pressure in compartment 5 to change momentarily. Due to the pressure unbalance thus caused between the compartments 5 and 10, air is caused to flow through the duct sections 18, 19 and 20, as the system automatically tends to restore an equal pressure in both compartments. The variation which such flow causes in the amount of air in compartment 10, is immediately compensated by a corresponding movement of the movable assembly composed of the vessel 14 and the weights 17; the response of the movable assembly being such that the pressure in compartment 10 is maintained exactly constant and unchanged. This constant pressure will be restored in compartment 5 when the movement of the valve disk 3 ceases. The amplitude and duration of the momentary pressure variation in compartment 5 can be adjusted by changing the number of blocks 21 in the duct section 19 between the compartments to modify the head loss resulting from the flow of the gas through the duct sections 18, 19 and 20, as has been indicated.

The casing 28 which forms a deflecting hood for the jet striking the valve disk 3, collects the permanent leakage fluid and directs it toward a discharge outlet 29. The casing 28 is aerated by special air ducts 30 through which air is sucked from the atmosphere and directed to the underside of the circular screen of water discharging from the valve disk 3, and by openings 30' through which air passes from the atmosphere to the space between such screen of water and the top of the casing. The ducts 30 and openings 30' by such aeration eliminate the possibility of air being trapped in the hood by the circular screen of water discharging from the valve disk 3.

As has previously been indicated, the embodiment of the invention above described and shown in the drawing is for the purpose of illustrating the advantages and features of the invention, and changes and modifications may be made in such embodiment without departing from the spirit of the invention, or the scope of the appended claims.

I claim:

1. A controller to affect pressure control of a fluid in a chamber, the enclosing wall of which is provided with an outwardly extending discharge nozzle for creating a leakage jet with the flow therethrough of the fluid from such chamber, said controller being positionable exteriorly of the enclosing wall of such chamber and comprising a valve arranged to face the exterior orifice of such nozzle to enable the force of the leakage jet therefrom to act directly to actuate said valve, a receiver having a body to be mounted in fixed relation to such nozzle and containing gas at a substantially constant means pressure for balancing the fluid force exerted on said valve, said gas receiver comprising two separate compartments and a duct connecting said compartments, both of said compartments being filled with said gas at said constant mean pressure and said duct being constructed to cause a given head loss when gas flows therethrough, one of said compartments having a hermetic movable wall portion carrying said valve and movable therewith, said one compartment having a given volume so that a temporary variation of the gas pressure therein is effected whenever a movement of the valve occurs due to a change in the force of the leakage jet, and said one compartment being provided with a second hermetic movable wall portion, and means supporting said second wall portion and operable to shift the same to readjust the volume of said one compartment.

2. A pressure controller operable by a leakage jet from a fluid passage to effect control of the fluid, comprising a valve controlled by the force of such jet, a gas receiver containing gas at a substantially constant mean pressure for balancing the fluid force exerted on said valve, said gas receiver comprising two separate compartments and a duct connecting said compartments, said duct being constructed to cause a given head loss when gas flows therethrough, one of said compartments having a hermetic movable wall portion rigid with relation to said valve and movable therewith, and said one compartment having a given volume so that a temporary variation of the gas pressure therein is effected whenever a movement of the valve occurs, and the other of said compartments being telescoped within said one compartment to provide a common wall therebetween, means for supporting said other compartment for movement relative to said one compartment and operable to shift said other compartment to change the volume of said one compartment, and means hermetically sealing the juncture of the telescoping portions of said compartments.

3. A pressure controller operable by a leakage jet from a fluid passage to effect control of the fluid, comprising a valve controlled by the force of such jet, a gas receiver containing gas at a substantially constant mean pressure for balancing the fluid force exerted on said valve, said gas receiver comprising two separate compartments and a duct connecting said compartments, said duct being constructed to cause a given head loss when gas flows therethrough, one of said compartments having a hermetic movable wall portion rigid with relation to said valve and movable therewith, and said one compartment having a given volume so that a temporary variation of the gas pressure therein is effected whenever a movement of the valve occurs, a deflecting hood for collecting the fluid discharged by said valve, means mounted on said hood for supporting said one compartment, the other of said compartments being superposed on said one compartment, and means mounted on said one compartment for supporting said other compartment, a container movably mounted in hermetically sealed relation on said other compartment so that the bottom thereof forms the top wall portion of said other compartment, and weighing means contained in said container for applying a constant force to said top wall portion and through the latter to the gas in said other compartment.

References Cited by the Examiner

UNITED STATES PATENTS

| 1,370,130 | 3/21 | Larner | 251—338 XR |
| 2,103,378 | 12/37 | Oestnaes et al. | 188—98 XR |
| 2,408,708 | 10/46 | Tweedle | 251—338 XR |
| 2,984,253 | 5/61 | Stout et al. | 251—4 XR |
| 2,991,992 | 7/61 | Elsner | 188—98 XR |

FOREIGN PATENTS 999,137  10/51  France.

ISADOR WEIL, *Primary Examiner.*

WILLIAM F. O'DEA, *Examiner.*